United States Patent [19]

Chien

[11] Patent Number: 5,321,347

[45] Date of Patent: Jun. 14, 1994

[54] BATTERY CHARGER DEVICE AND METHOD

[76] Inventor: Chih-Chien Chien, No. 169, Ching-Chin Lane, Ching-Hsi Li, Ping-Tung City, Taiwan

[21] Appl. No.: 993,296

[22] Filed: Dec. 18, 1992

[51] Int. Cl.⁵ .............................................. H02J 7/10
[52] U.S. Cl. ........................................ 320/21; 320/39
[58] Field of Search .................................. 320/21, 39, 20

[56] References Cited

U.S. PATENT DOCUMENTS

| 3,800,208 | 3/1974 | Macharg | 320/20 |
| 3,936,718 | 2/1976 | Melling et al. | 320/20 |
| 4,549,127 | 10/1985 | Taylor et al. | 320/21 |

Primary Examiner—R. J. Hickey
Attorney, Agent, or Firm—Poms, Smith, Lande & Rose

[57] ABSTRACT

A battery charger device is provided with a control switch which connects electrically a rechargeable battery load to a power supply which supplies charging current for charging the battery load. A pulse generator generates a series of pulses that control the control switch to connect and disconnect intermittently the power supply and the battery load. A maximum battery terminal voltage of the battery load is stored in a voltage memory means, and a fractional voltage is derived from the maximum battery terminal voltage. The fractional voltage is compared with a current battery terminal voltage from the battery load. A control signal is generated so as to prevent the control switch from receiving the pulses from the pulse generator, thereby disconnecting the power supply from the battery load so as to terminate charging of the battery load when the current battery terminal voltage is less than the fractional voltage.

7 Claims, 16 Drawing Sheets

BATTERY CHARGER DEVICE AND METHOD

BACKGROUND OF THE INVENTION

1. Field of the Invention

The invention relates to a battery charger device, more particularly to a battery charger device and method for charging different types of rechargeable batteries.

2. Description of the Related Art

Devices for charging and recharging various types and sizes of storage batteries, such as nickel-cadmium (Ni-Cd) battery cells and lead-acid cells, are known in the art. There are different types of battery charger devices which are presently available to the consumers. This is due in part to the absence of a standard for regulating the voltage characteristics of the storage batteries. The fast charger is one example of a conventional battery charger device and is capable of generating a relatively large charge current in order to charge the storage battery within a relatively short period of time. The large charge current, however, can cause rapid heating of the storage battery, thereby resulting in damage to the storage battery or a reduction in the useful life of the same if the storage battery was overcharged or if the fast charger was operated in cold weather conditions.

The trickle charger is another example of a conventional battery charger device and generates a relatively small charge current, typically 10% of the maximum charge current which can be accepted by the storage battery. Such chargers do not require means for protecting the storage battery from overcharging and require relatively long charging periods. Thus, a storage battery which was charged by the trickle charger is sometimes insufficiently charged and cannot be used to drive an electrical load properly.

U.S. Pat. No. 5,055,763 discloses an electronic battery charger device which is used to charge one or more storage batteries and which comprises a circuit with terminal means that is to be connected to the storage batteries. The circuit includes a source of electric energy, controllable switching means connected respectively between the energy source and each storage battery to be charged, and a microprocessor having a control connection to each of the controllable switching means for controlling communication between the energy source and the respective storage batteries to be charged. The microprocessor includes means for sequentially controlling the switching means to supply charging current to the storage batteries one at a time in repeating periods. The circuit further includes means responsive to the voltage across the terminals of each storage battery prior to and during each charging period thereof and operatively connected to the microprocessor. The microprocessor is programmed to calculate the difference between the battery terminal voltage of each storage battery prior to and when it is being charged. The circuit also includes means for storing for each storage battery the minimum value of the voltage difference during each charging period, and means to terminate a charging operation for a storage battery when the battery terminal voltage difference being calculated exceeds the minimum stored value of the battery terminal voltage difference by a predetermined amount.

Note that in the above disclosed electronic battery charger device, the charging operation is continued until the battery terminal voltage difference exceeds the minimum stored value by a predetermined amount. This type of a charging operation is not suitable for lead-acid cells and can cause damage to the same. The battery charger device can only be used with nickelcadmium battery cells, thereby reducing the utility of the conventional battery charger device.

In the above disclosed battery charger device, trickle charging is effected when the battery voltage is less than 0.7 volts. A storage battery with such an open circuit voltage is abnormal and should not undergo a fast charging operation. Therefore, the above disclosed battery charger is not capable of performing the trickle charging operation when a normal storage battery is installed.

SUMMARY OF THE INVENTION

Therefore, the main objective of the present invention is to provide a battery charger device which is capable of charging different types of rechargeable batteries and which can overcome the drawbacks which are commonly associated with the prior art.

Another objective of the present invention is to provide a battery charger device which is capable of varying automatically the charging current to the rechargeable battery load in accordance with the charging state of the latter.

In one aspect of the present invention, a battery charger device comprises:

a power supply means for supplying charging current to charge a rechargeable battery load;

a control switch means for connecting electrically the power supply means and the battery load; and a charging control unit including: a pulse generator means for generating a series of pulses which control the control switch means to connect and disconnect intermittently the power supply means and the battery load; a voltage memory means connected to the battery load for storing a maximum battery terminal voltage of the battery load therein; a voltage divider means receiving the maximum battery terminal voltage from the voltage memory means and deriving a fractional voltage from the maximum battery terminal voltage; and a comparator means for comparing the fractional voltage with a current battery terminal voltage from the battery load, said comparator means generating a control signal which prevents the control switch means from receiving the pulses from the pulse generator means, thereby disconnecting the power supply means from the battery load so as to terminate charging of the battery load when the current battery terminal voltage is less than the fractional voltage.

In another aspect of the present invention, a battery charger device comprises:

a power supply means for supplying charging current to charge a rechargeable battery load;

a voltage-controlled current providing device which connects electrically the power supply means and the battery load; and a charging control unit including: a pulse generator means for generating a series of pulses which control the current providing device to connect and disconnect intermittently the power supply means and the battery load; a voltage memory means connected to the battery load for storing a maximum battery terminal voltage of the battery load therein; first and second voltage divider means which receive the maximum battery terminal voltage from the voltage memory means and which respectively derive higher and lower fractional voltages from the maximum battery terminal voltage; first and second comparator means for comparing a respective one of the higher and lower fractional voltage with a current battery terminal voltage from the battery load; a current control unit which generates an increasing analog voltage signal if the current battery terminal voltage is greater than the higher fractional voltage and a decreasing analog voltage signal if the current battery terminal voltage is less than the lower fractional voltage, said current providing device receiving the analog voltage signal from the current control unit and controlling the amount of charging current supplied to the battery load so as to correspond with the analog voltage signal; and a switch control unit which generates a control signal for preventing the current providing device from receiving the pulses from the pulse generator means when the analog voltage signal from the current control unit is less than a preset cut-off voltage, thereby disconnecting the power supply means from the battery load.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
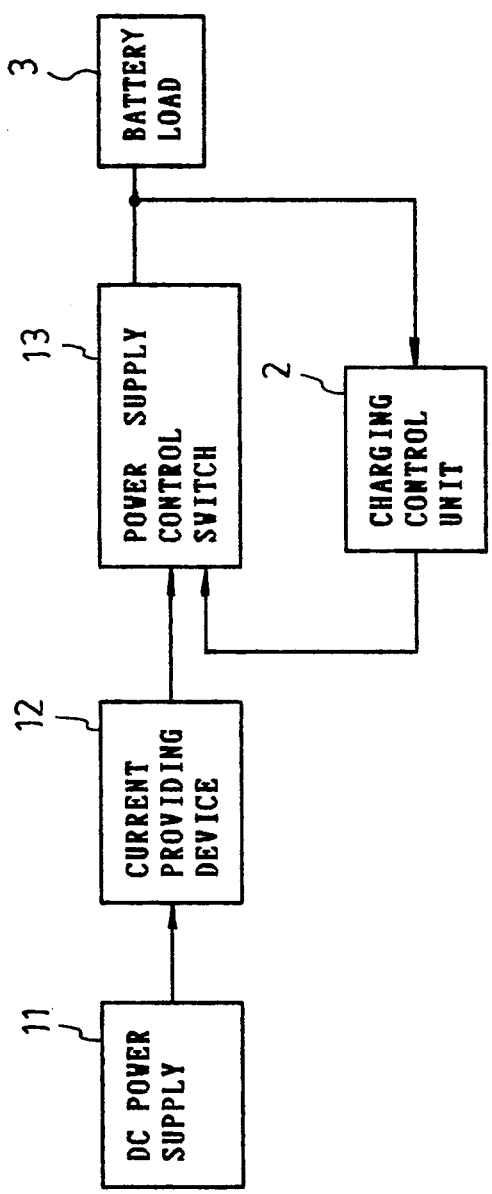
FIG. 1 is a schematic circuit block diagram of the first preferred embodiment of a battery charger device according to the present invention.

Referring to FIG. 1, the first preferred embodiment of a battery charger device according to the present invention is shown to comprise a dc power supply (11), a current providing device (12) (such as a current limiter or a constant current device), a power supply control switch (13) and a charging control unit (2). The charging control unit (2) controls operably the control switch (13) so as to start or stop charging of a battery load (3).

Figure 2:
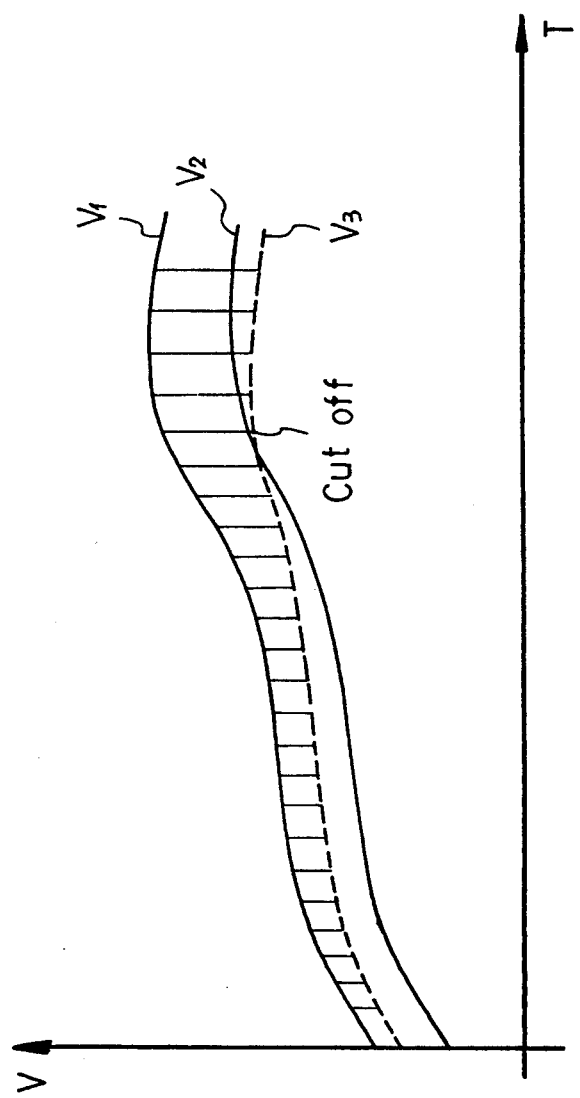
FIG. 2 is a waveform diagram illustrating the various signals which are obtained when the first preferred embodiment is operated.

FIG. 2 is a waveform diagram illustrating the various signals which are obtained when the first preferred embodiment is operated. The charging control unit (2) is used to interrupt intermittently the supply of charging current to the battery load (3). The charging control unit (2) memorizes the maximum battery terminal voltage (V1) of the battery load (3). The charging control unit (2) then compares a fractional voltage (V2) of the battery terminal voltage (V1) with the current battery terminal voltage (V3) when the supply of charging current to the battery load (3) is interrupted. The spikes in the plot of the current battery terminal voltage (V3) indicate that the battery terminal voltage (V3) drops when the supply of charging current to the battery load (3) is interrupted. Charging of the battery load (3) is continued as long as the current battery terminal voltage (V3) is greater than the fractional voltage (V2). Otherwise, the charging control unit (2) controls operably the control switch (13) so as to break the electrical connection between the power supply (11) and the battery load (3).

Figure 3:
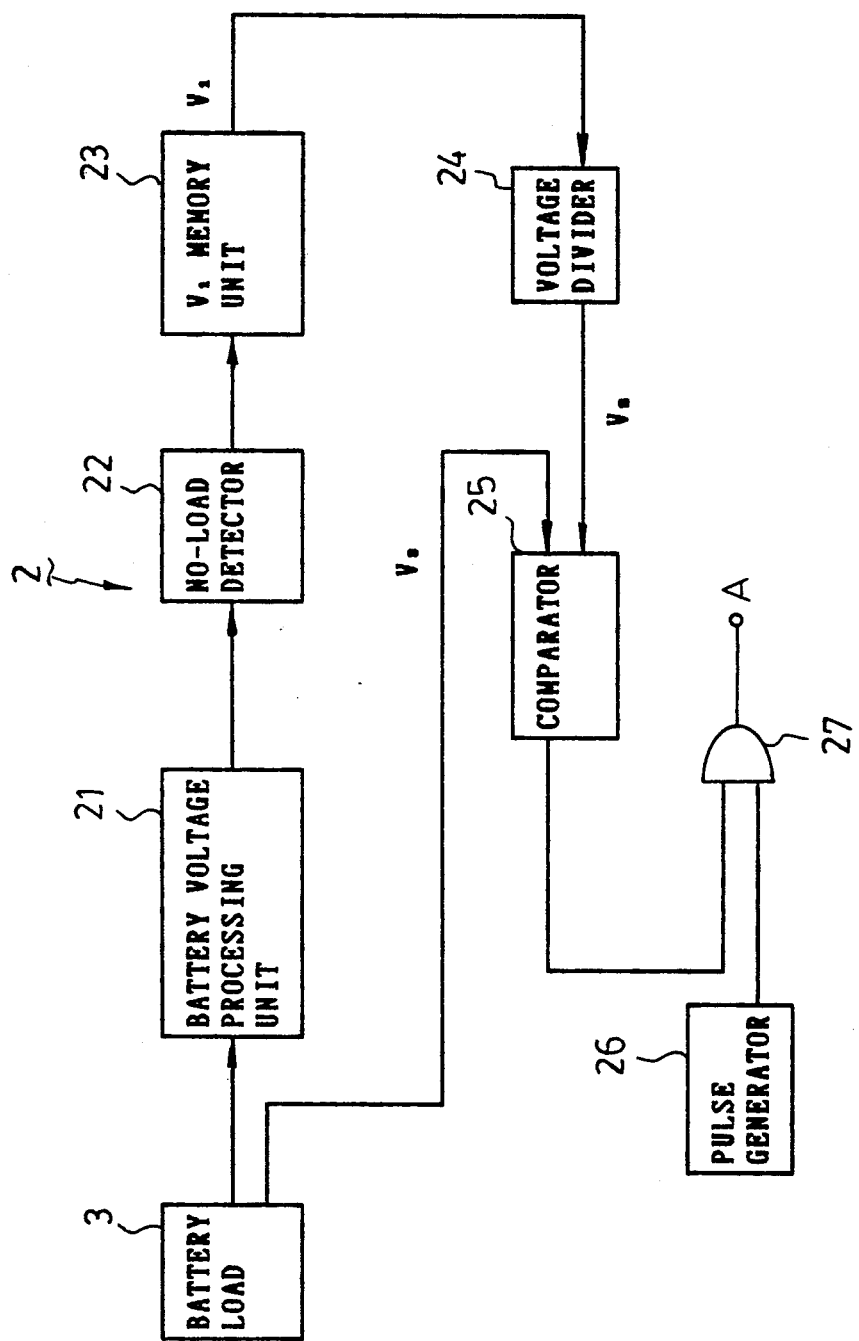
FIG. 3 is a schematic circuit block diagram of a charging control unit of the first preferred embodiment.
Figure 4:
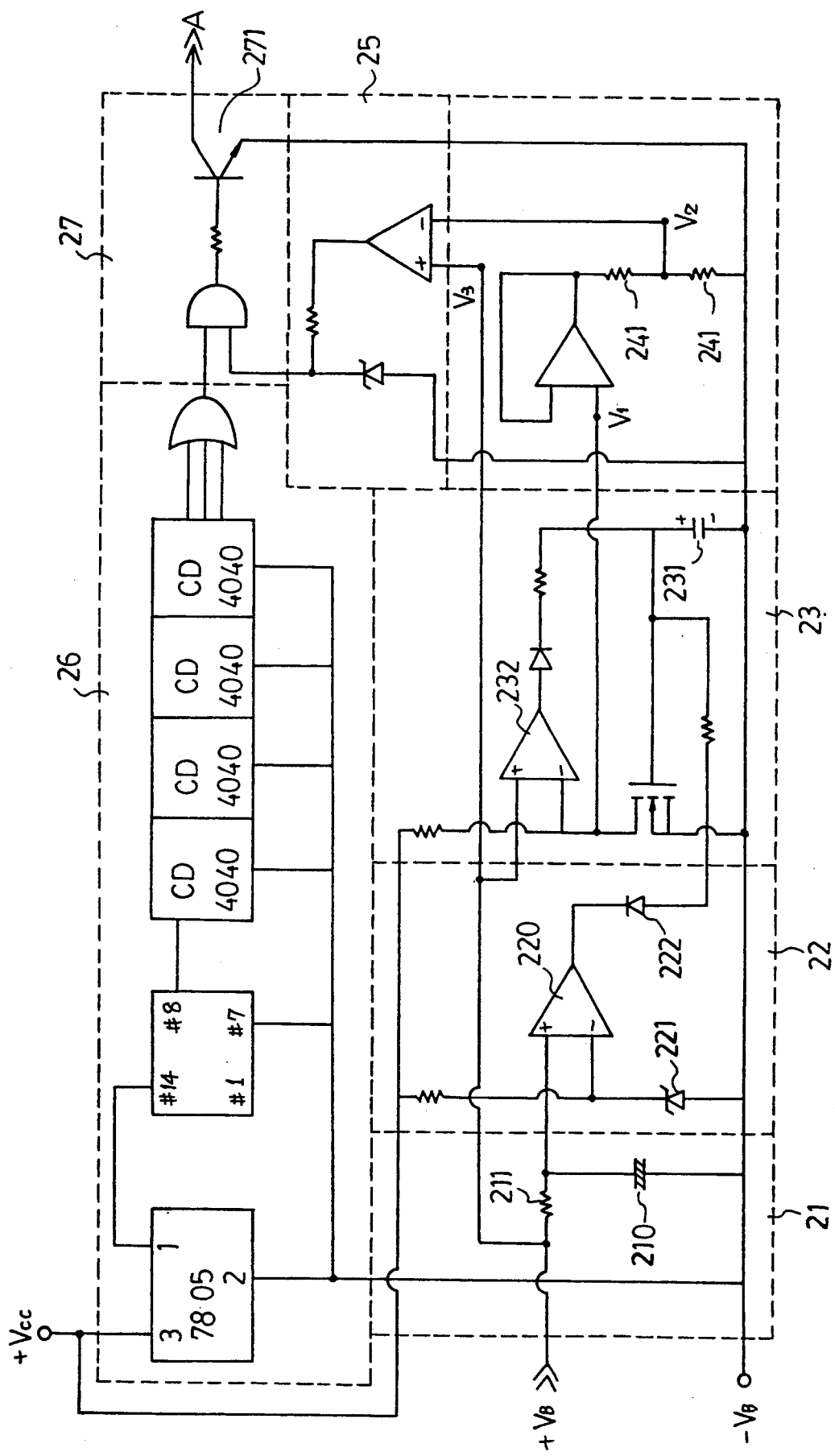
FIG. 4 is a schematic circuit diagram of the charging control circuit shown in FIG. 3.

Referring to FIGS. 3 and 4, the charging control unit (2) includes a battery voltage processing unit (21), a no-load detector (22), a maximum battery terminal voltage (VI) memory unit (23), a voltage divider (24), a comparator (25), a pulse generator (26) and an AND gate (27).

The processing unit (21) includes a capacitor (210) and a resistor (211). The processing unit (21) is connected across the battery load (3), thereby charging the capacitor (210) to the current battery terminal voltage (V3) via the resistor (211). The voltage across the capacitor (210) serves as one of the inputs to an operational amplifier (220) of the no-load detector (22). The no-load detector (22) is used to detect if a battery load (3) is connected to the battery charger device. The other input of the operational amplifier (220) is connected to a zener diode (221). The operational amplifier (220) compares the current battery terminal voltage (V3) with the reverse bias voltage of the zener diode (221). A diode (222) is used to connect the output of the operational amplifier (220) and the memory unit (23). If the current battery terminal voltage (V3) is greater than the reverse bias voltage of the zener diode (221), a high logic signal is present at the output of the operational amplifier (220), thereby preventing the conduction of the diode (222) to indicate the presence of a battery load (3). The operational amplifier (220) does not affect the operation of the memory unit (23) at this stage.

The memory unit (23) stores the maximum battery terminal voltage (V1) in a capacitor (231). The memory unit (23) includes an operational amplifier (232) which is used to compare the maximum battery terminal voltage (V1) stored in the capacitor (231) with the current battery terminal voltage (V3). If the latter is greater than the former, the operational amplifier (232) generates a high logic signal to charge the capacitor (231) to the current battery terminal voltage (V3). Otherwise, the voltage across the capacitor (231) is maintained at its present value. The maximum battery terminal voltage (V1) is received by the voltage divider (24) which derives the fractional voltage (V2) therefrom. The ratio of the fractional voltage (V2) to the maximum battery terminal voltage (V1) depends upon the magnitude of the resistors (241, 242). The comparator (25) is responsible for comparing the fractional voltage (V2) with the current battery terminal voltage (V3). The comparator (25) generates a high logic signal if the current battery terminal voltage (V3) is greater than the fractional voltage (V2). The comparator (25) and the pulse generator (26) are connected to the inputs of the AND gate (27). When the outputs of the comparator (25) and the pulse generator (26) are at a high logic state, the output of the AND gate (27) is similarly at a high logic state, thereby causing a transistor (271) to conduct. The output (A) of the charging control unit (2) is at a low logic state, thereby permitting the supply of charging current to the battery load (3).

When the output of the comparator (25) is at a high logic state but the output of the pulse generator (26) is at a low logic state, the output of the AND gate (27) is at a low logic state. The transistor (271) is in a non-conducting state, and the output (A) of the charging control unit (2) is at a high logic state, thereby preventing the supply of charging current to the battery load (3). It has thus been shown that the output of the pulse generator (26) is used to control the intermittent supply of charging current to the battery load (3). The output of the comparator (25), however, is used to terminate the charging operation when the current battery terminal voltage (V3) is less than the fractional voltage (V2).

Figure 5:
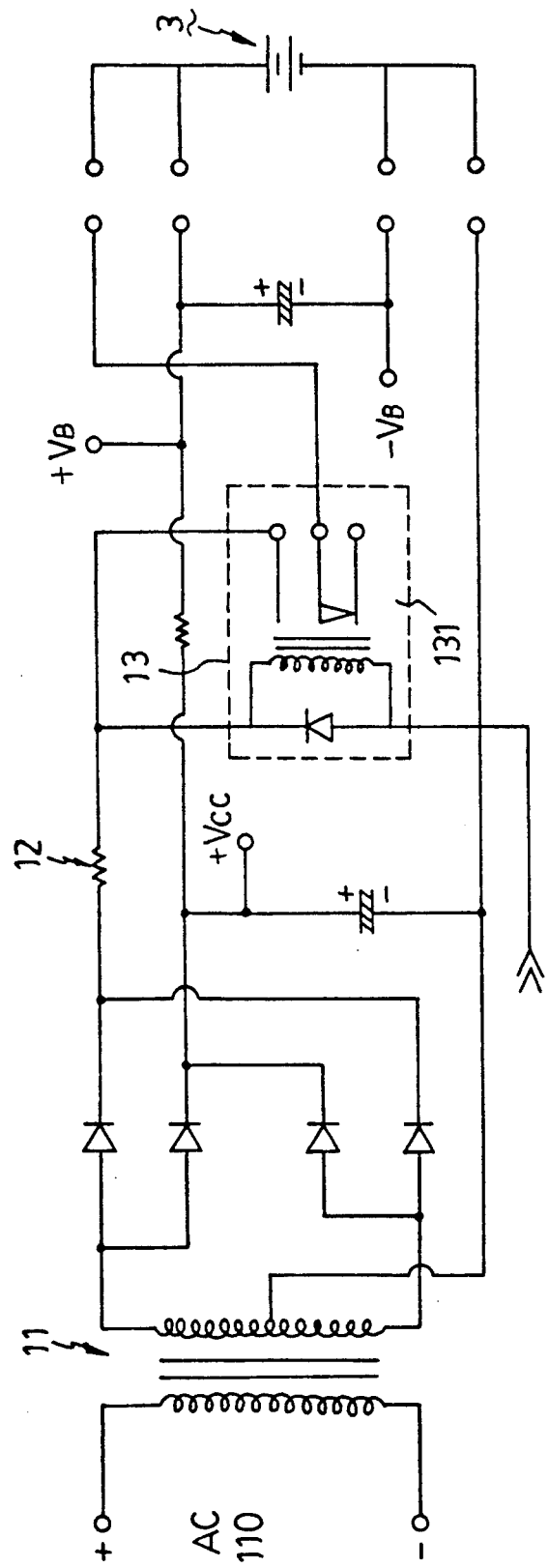
FIG. 5 is a schematic circuit diagram which illustrates how the charging control circuit shown in FIG. 4 controls the operation of a power supply control switch of the first preferred embodiment.

FIG. 5 illustrates how the charging control unit (2) controls the operation of the control switch (13). The control switch (13) is used to connect electrically the power supply (11) and the battery load (3). When the output (A) of the charging control unit (2) is at a low logic state, a relay (131) of the control switch (13) conducts, thereby permitting the flow of charging current to the battery load (3). When the output (A) of the charging control unit (2) is at a high logic state, the relay (131) is opened, thereby preventing the flow of charging current to the battery load (3).

Referring once more to FIG. 2, a continuous increase in the terminal voltages (V1, V3) is detected as long as the battery load (3) has not been charged to a saturation point. When the battery load (3) has been charged to the saturation point, the terminal voltage (V3) becomes less than the fractional voltage (V2), thereby causing the output (A) of the charging control unit (2) to change to the high logic state and control the control switch (13) so as to break the electrical connection between the power supply (11) and the battery load (3). In this embodiment, the fractional voltage (V2) is preferably 0.9 times of the maximum battery terminal voltage (V1). The ratio of the fractional voltage (V2) to the maximum battery terminal voltage (VI), however, may be adjusted so as to correspond with the characteristics of the battery load (3) to be charged.

It has thus been shown that the battery charger device of the present invention compares the current battery terminal voltage (V3) with a fractional voltage (V2) of the maximum battery terminal voltage (V1) in order to determine whether the battery load (3) has been charged to the saturation level. Of course, indicators (not shown) may be incorporated in the battery charger device of the present invention so as to indicate if charging of the battery load (3) is ongoing or has been terminated. Such circuit modifications can be easily accomplished by one who is skilled in the art and will not be detailed herein.

Figure 6:
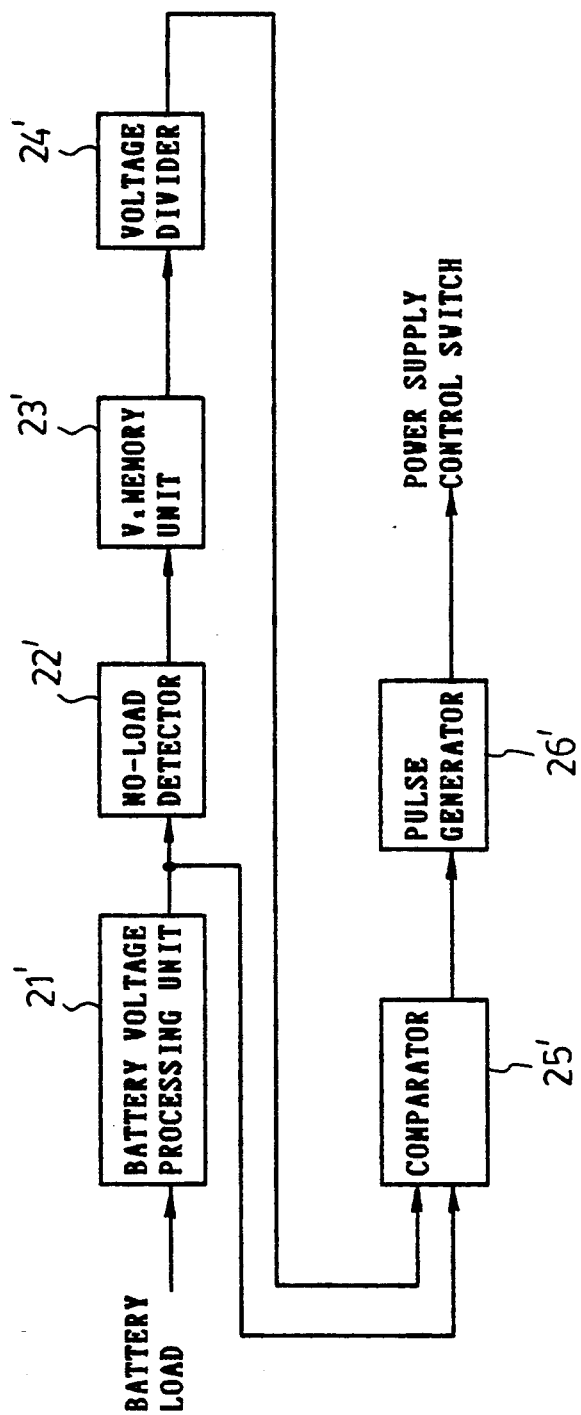
FIG. 6 is a schematic circuit block diagram of the charging control unit of the second preferred embodiment of a battery charging device according to the present invention.
Figure 7:
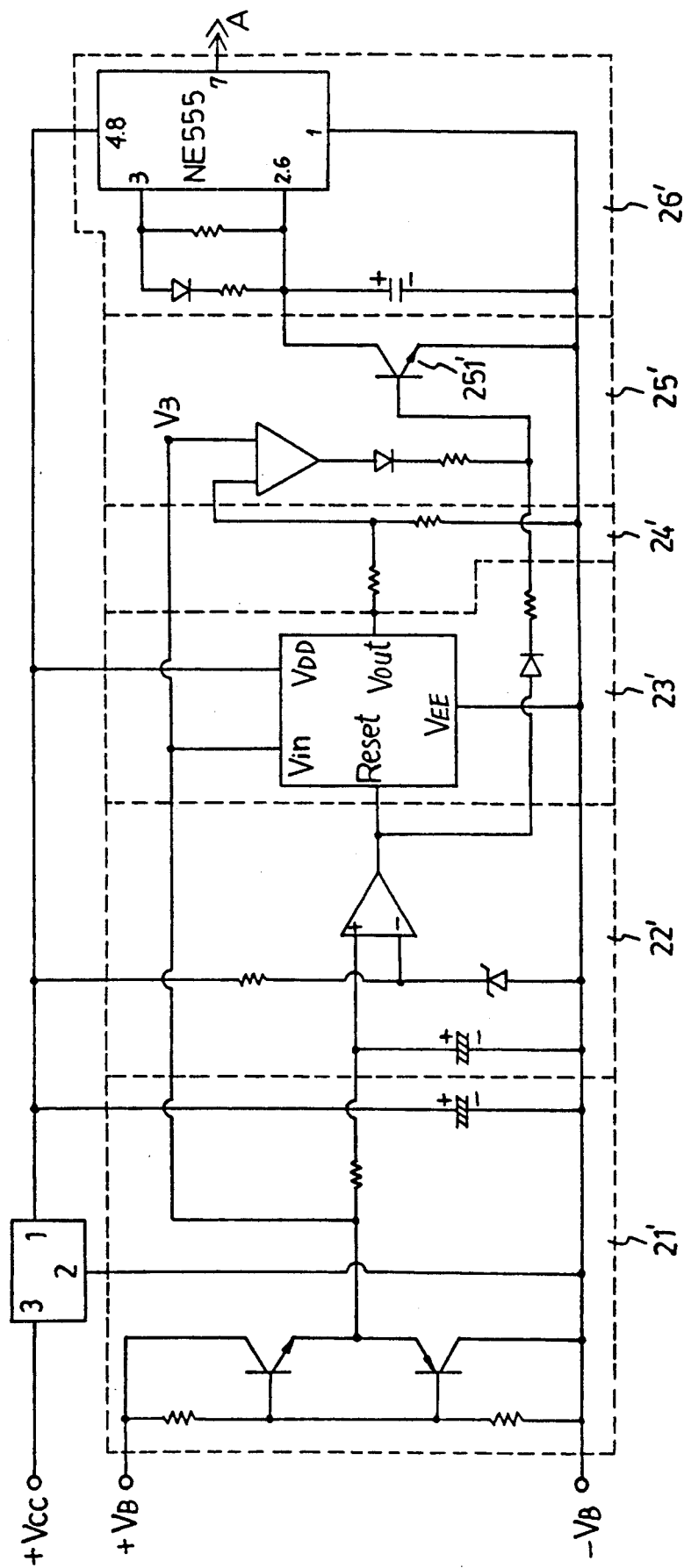
FIG. 7 is a schematic circuit diagram of the charging control unit shown in FIG. 6.

FIG. 6 is a schematic circuit block diagram of the charging control unit (2') of the second preferred embodiment of a battery charging device according to the present invention. In this embodiment, the output of the comparator (25') is connected to the input of the pulse generator (26'). Referring to FIGS. 6 and 7, the charging control unit (2') further includes a battery voltage processing unit (21'), a no-load detector (22'), a maximum battery terminal voltage (V1) memory unit (23') and a voltage divider (24').

Figure 8:
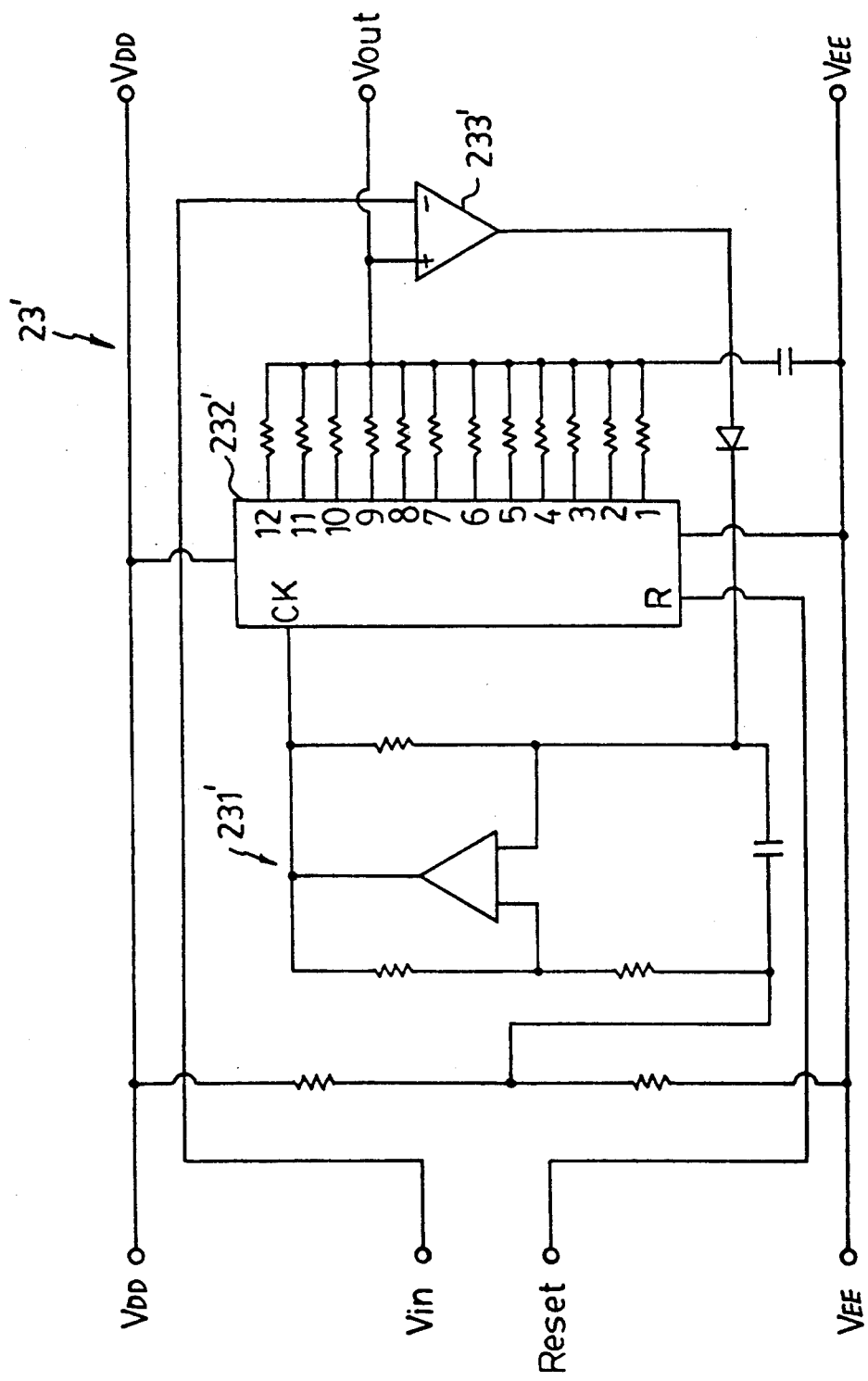
FIG. 8 is a schematic circuit diagram of a maximum battery terminal voltage memory unit of the charging control unit shown in FIGS. 6 and 7.

The charging control unit (2') is substantially similar to that shown in FIG. 4. The main difference between the charging control units (2, 2') lies in the configuration of the memory unit (23'). Referring to FIG. 8, the memory unit (23') includes an oscillator circuit (231'), an up-counter (232') and an operational amplifier (233'). The up-counter (232') receives pulse signals from the oscillator circuit (231') and generates an analog output which corresponds to the pulses received thereby. The operational amplifier (233') compares the analog output from the up-counter (232') with the current battery terminal voltage (V3). If the analog output is less than the current battery terminal voltage (V3), the oscillator circuit (231') continues to provide pulse signals to the up-counter (232'). If the analog output is greater than the current battery terminal voltage (V3), the operational (amplifier (233') generates a low logic signal which is received by the oscillator circuit (231'), thereby preventing the latter from further providing pulse signals to the up-counter (232'). The output of the upcounter (233') is thus maintained and corresponds to the maximum battery terminal voltage (V1). The succeeding operations are similar to those executed in the preceding embodiment. The maximum battery terminal voltage (V1) is received by the voltage divider (24'). The voltage divider (24') derives the fractional voltage (V2) from the maximum battery terminal voltage (V1). The comparator (25') compares the fractional voltage (V2) with the current battery terminal voltage (V3). The comparator (25') then generates a low logic signal if the current battery terminal voltage (V3) is greater than the fractional voltage (V2), thus preventing a transistor (251') from conducting. The pulse generator (26') utilizes an RC charge-discharge circuit to generate a pulse train output which serves as the output (A) of the charging control unit (2'). The output (A) is connected to the control switch (13) (Refer to FIG. 5) and is used to effect the intermittent supply of charging current to the battery load (3).

The comparator (25') generates a high logic signal if the current battery terminal voltage (V3) is less than the fractional voltage (V2). The transistor (251') conducts at this stage and prevents a capacitor of the RC circuit of the pulse generator (26') from discharging, thereby preventing the pulse generator (26') from providing a pulse train output at the output (A) of the charging control unit (2'). Charging of the battery load (3) is terminated at this stage.

Figure 9:
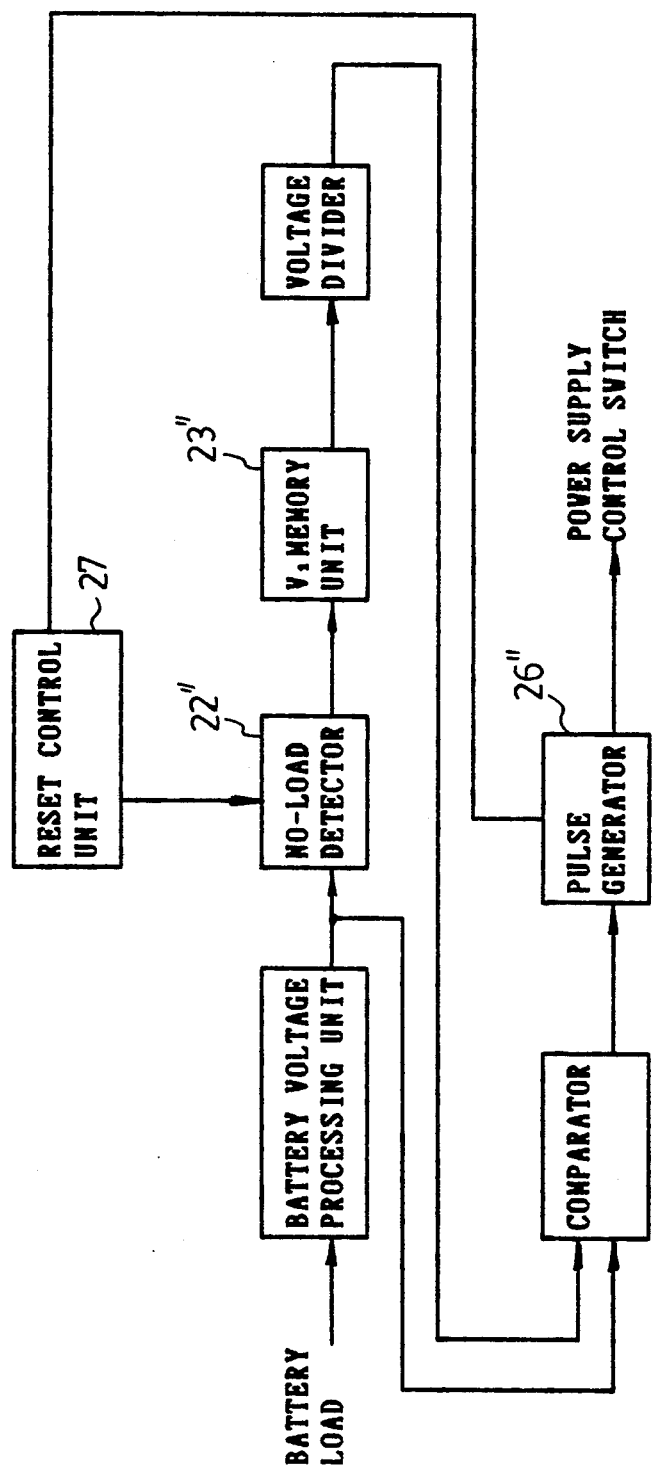
FIG. 9 is a schematic circuit block diagram of the charging control unit of the third preferred embodiment of a battery charging device according to the present invention.
Figure 10:
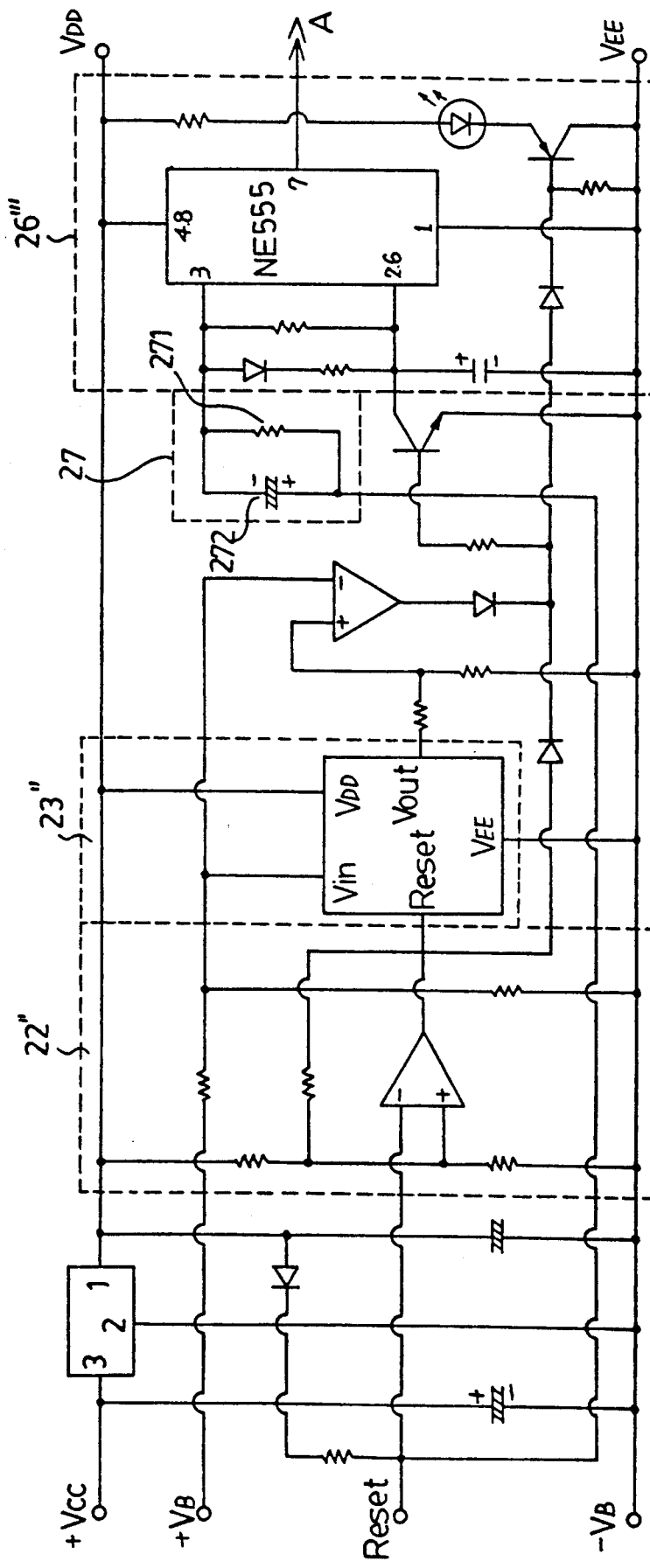
FIG. 10 is a schematic circuit diagram of the charging control unit shown in FIG. 9.

FIGS. 9 and 10 are illustrations of the charging control unit (2") of the third preferred embodiment of a battery charging device according to the present invention. The charging control unit (2") is substantially similar to the charging control unit (2') of the second preferred embodiment. The charging control unit (2"), however, is provided with a reset control unit (27). The reset control unit (27) is controlled by the pulse generator (26") and includes a resistor (271) which is connected across a capacitor (272). The output terminal of the reset control unit (27) is connected to the no-load detector (22"). When the output of the pulse generator (26") changes from a high logic state to a low logic state, the reset control unit (27) generates a reset signal to the no-load detector (22"), thereby causing the output of the latter to change to a low logic state and thus reset the memory unit (23"). The analog voltage which was previously stored in the memory unit (23") is thus erased. Therefore, the maximum battery terminal voltage (V1) for the succeeding charging period can be stored in the memory unit (23") when the output of the pulse generator (26") reverts to the high logic state.

The preceding embodiments relate to a limited current or to a constant current charging method. The configuration of the preceding embodiments can be modified so as to permit automatic adjustments in the amount of charging current in order to correspond with the charging characteristics of the battery load.

Figure 11:
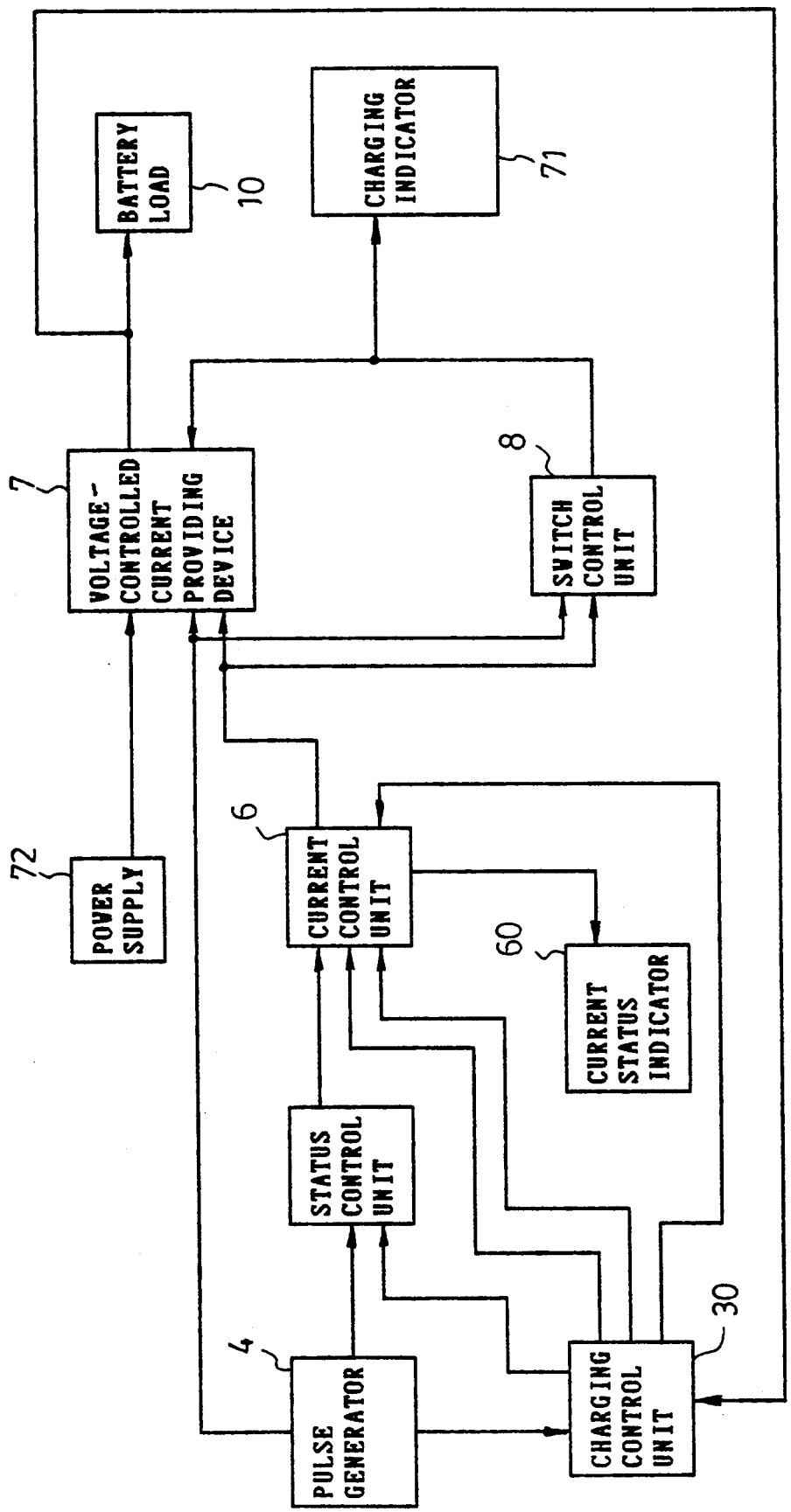
FIG. 11 is a schematic circuit block diagram of the fourth preferred embodiment of a battery charging device according to the present invention.

Referring to FIG. 11, the fourth preferred embodiment of a battery charger device according to the present invention is shown to comprise a charging control unit (30), a pulse generator (4), a status control unit (5), a current control unit (6), a current status indicator (60), a voltage-controlled current providing device (7), a switch control unit (8), a charging indicator (71) and a dc power supply (72).

Figure 12:
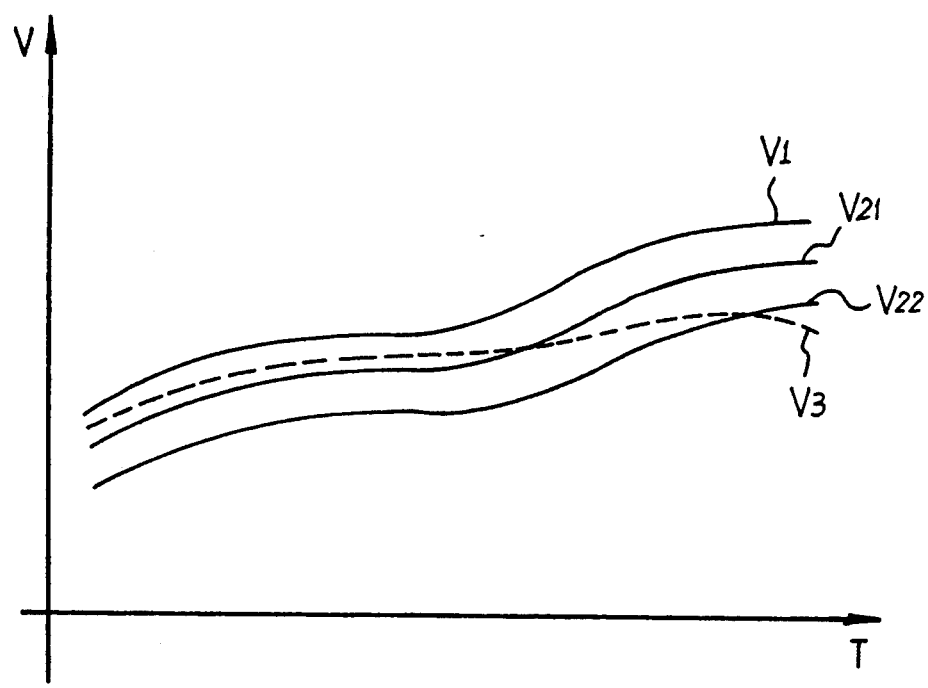
FIG. 12 is a waveform diagram illustrating the various signals which are obtained when the fourth preferred embodiment is operated.
Figure 13:
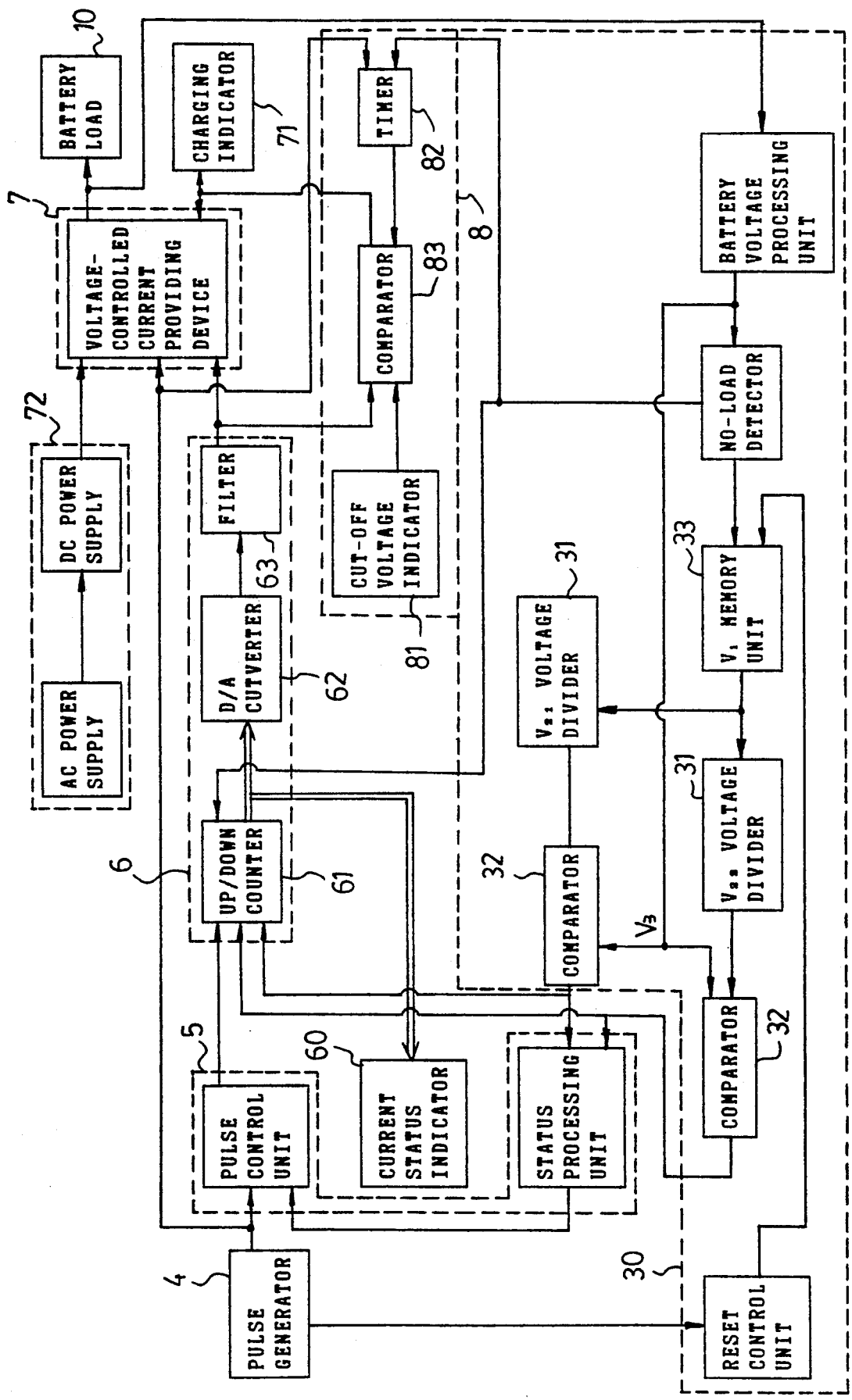
FIG. 13 is a schematic circuit block diagram which illustrates the fourth preferred embodiment in greater detail.
Figure 14:
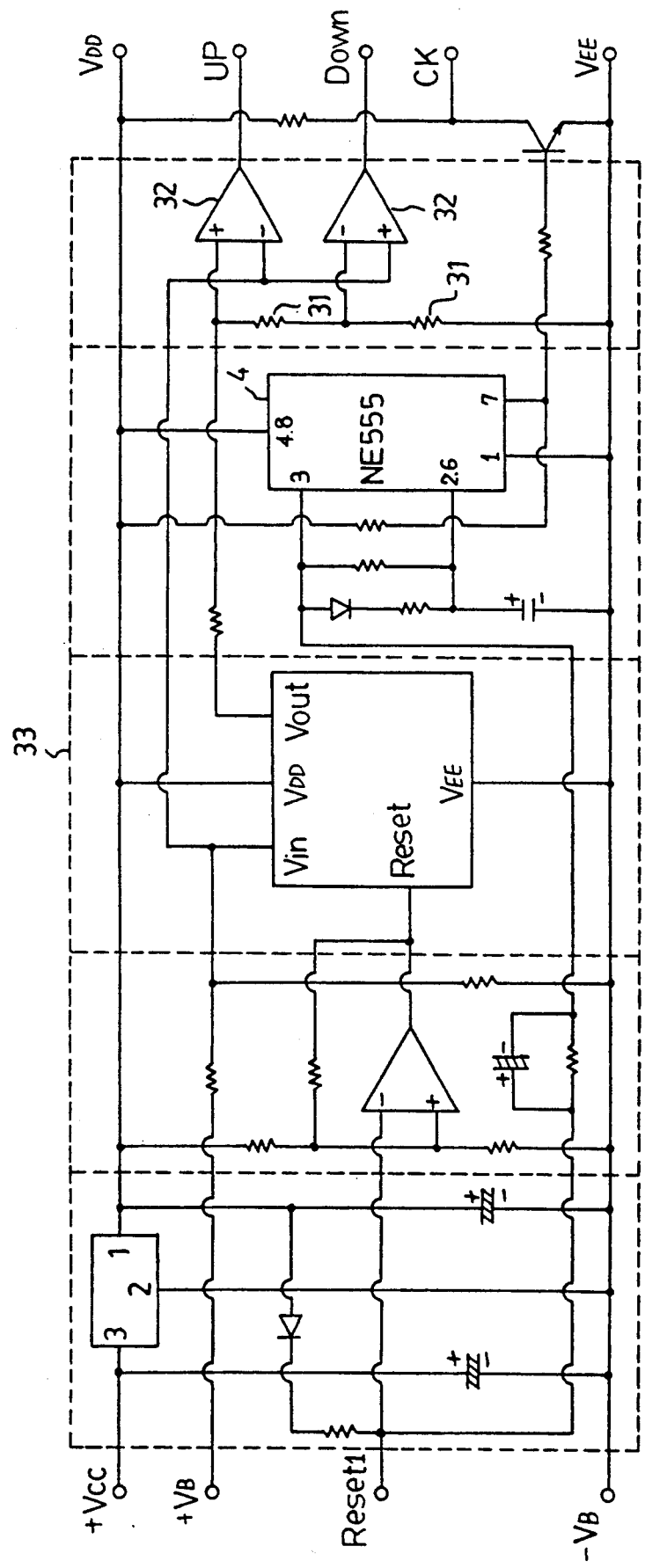
FIG. 14 is a schematic circuit diagram of a charging control unit and a pulse generator of the fourth preferred embodiment.
Figure 15:
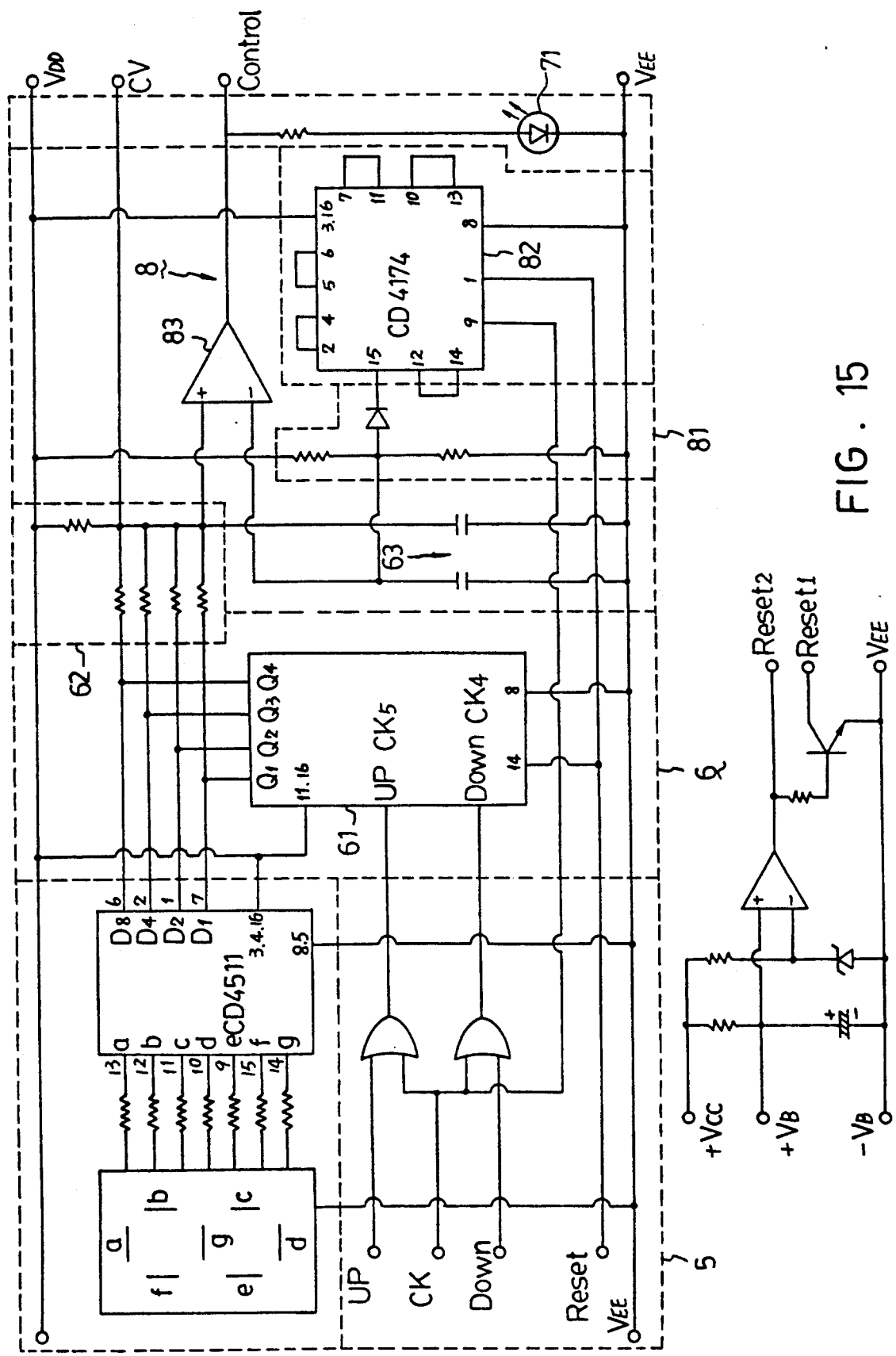
FIG. 15 is a schematic circuit diagram of a status control unit, a current control unit and a switch control unit of the fourth preferred embodiment.
Figure 16:
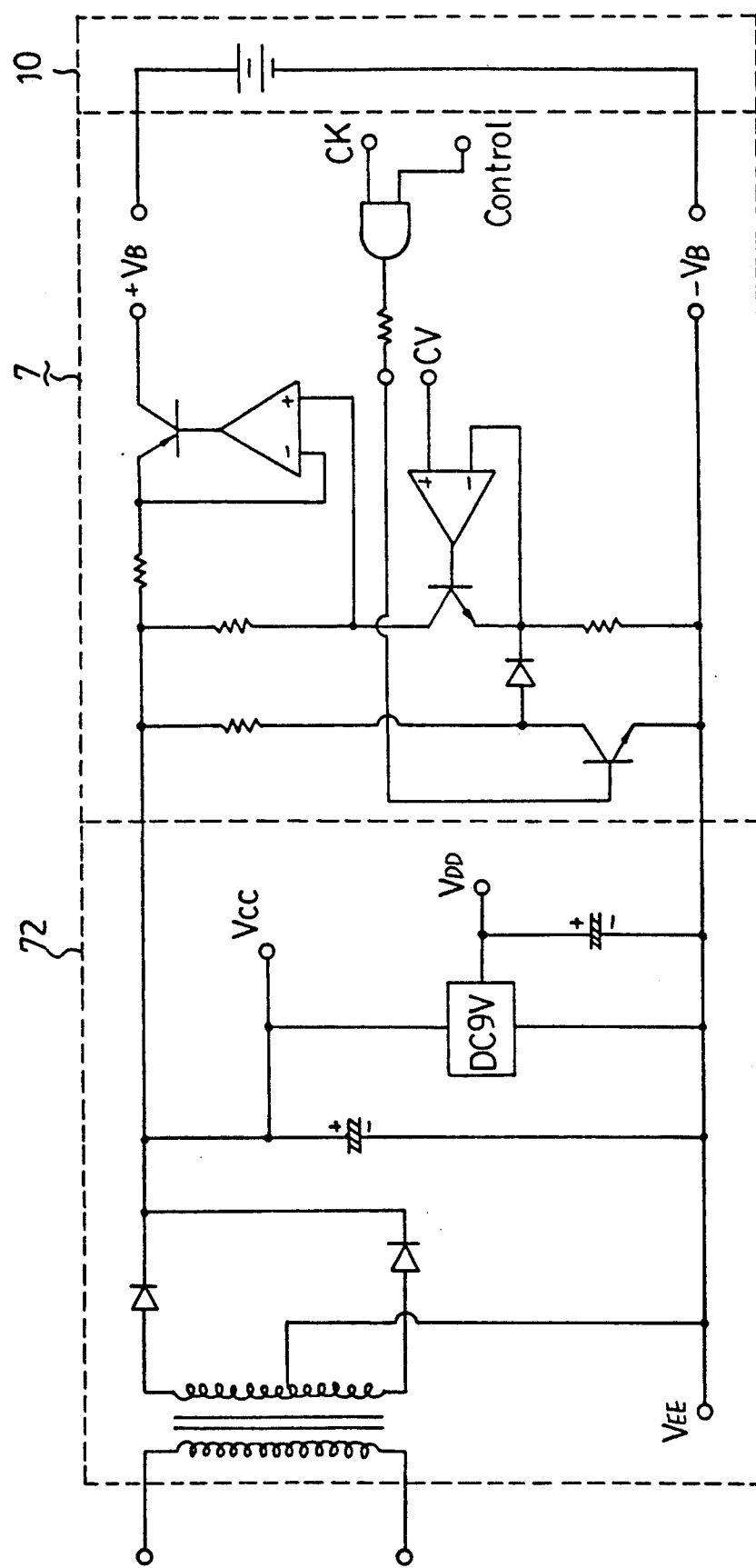
FIG. 16 is a schematic circuit diagram which illustrates a voltage controlled current providing device and a dc power supply of the fourth preferred embodiment.

FIG. 12 is a waveform diagram illustrating the various signals which are obtained when the fourth preferred embodiment is operated. As with the preceding embodiments, the charging control unit (30) memorizes the maximum battery terminal voltage (V1) of the battery load (10). The charging control unit (30) then compares higher and lower fractional voltages (V21, V22) of the maximum battery terminal voltage (V1) with the current battery terminal voltage (V3). A large charging current is supplied to the battery load (10) if the current battery terminal voltage (V3) is greater than the higher fractional voltage (V21). A small charging current is supplied to the battery load (10) if the current battery terminal voltage (V3) is less than the lower fractional voltage (V22). Charging of the battery load (10) is terminated if the current battery terminal voltage (V3) is between the higher and lower fractional voltages (V21, V22).

Referring to FIGS. 13 to 16, the charging control unit (30) is shown to be substantially similar to the charging control unit of the preceding embodiments. The charging control unit (30), however, has two sets of voltage dividers (31) and two sets of comparators (32). Each of the voltage dividers (31) derives the corresponding fractional voltage (V21, V22) from the maximum battery terminal voltage (V1). Each of the comparators (32) compares the current battery terminal voltage (V3) with a corresponding one of the fractional voltages (V21, V22). The outputs of the comparators (32) are received by the status control unit (5). The status control unit (5) is a logic control circuit which receives the pulse output of the pulse generator (4) and which informs the current control unit (6) if a large or small charging current is to be provided to the battery load (10).

The current control unit (6) includes an up/down counter (61), a digital-to-analog (D/A) converter (62) and a filter (63). The up/down counter (61) initiates an up or down counting operation in accordance with the output of the comparators (32) and the logic output of the status control unit (5). If the current battery terminal voltage (V3) is greater than the higher fractional voltage (V21), the up/down counter (61) executes an up counting operation. The up/down counter (61) executes a down counting operation if the current battery terminal voltage (V3) is less than the lower fractional voltage (V22). The count output of the up/down counter (61) is received by the D/A converter (62) and is converted into a corresponding analog voltage signal. The analog voltage signal is received by the voltage-controlled current providing device (7) via the filter (63). The current providing device (7) controls the amount of charging current from the power supply (72) to the battery load (10). When the up/down counter (61) is conducting an up counting operation, an increasing charging current is supplied to the battery load (10). When the up/down counter (61) is conducting a down counting operation, a decreasing charging current is supplied to the battery load (10). The analog voltage output of the current control unit (6) is also received by the current status indicator (60) so as to indicate clearly the amount of charging current being supplied to the battery load (10).

The switch control unit (8) is used to determine if charging of the battery load (10) is to be terminated. The switch control unit (8) includes a cut-off voltage indicator (81), a timer (82) and a comparator (83). The timer (82) permits charging of the battery load (10) for a predetermined time period after the fourth preferred embodiment has been switched on. Therefore, the instantaneous surge in the terminal voltage of the battery load (10), which instantaneous surge usually occurs when charging of the battery load (10) is initiated, is prevented from resulting in the erroneous operation of the charging control unit (30). The cut-off voltage indicator (81) is set so as to generate a voltage output which corresponds to the battery terminal voltage when only 10% of the normal charging current is being supplied to the battery load (10). The comparator (83) is used to detect a condition wherein the analog voltage output of the current control unit (6) is less than the preset voltage of the cut-off voltage indicator (81). Upon detection of such a condition, the comparator (83) generates a control signal to the voltage-controlled current providing device (7) so as to terminate charging of the battery load (10). Of course, the configuration of the switch control unit (8) may be modified so as to terminate charging of the battery load (10) after a preset charging period has elapsed. Such circuit modifications are known to one skilled in the art and will not be detailed herein.

The advantages and characterizing features of the battery charger device of the present invention are as follows:

1. The battery charger device compares the current battery terminal voltage with a fractional voltage of the maximum battery terminal voltage in order to determine whether the battery load has been charged to a saturation point. Charging of the battery load is terminated automatically when the current battery terminal voltage drops below the fractional voltage. The battery charger device of the present invention is ideal for use with different kinds of storage batteries since overcharging or undercharging of the storage batteries can be effectively prevented.

2. In one embodiment of the battery charger device of the present invention, the amount of charging current can be varied automatically so as to correspond with the charging characteristics of the battery load, thereby adapting the battery charger device for use with different kinds of storage batteries.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A battery charger device for charging a rechargeable battery load, comprising:
   a power supply means for supplying charging current to charge said battery load;
   a control switch means for connecting electrically said power supply means and said battery load; and
   a charging control unit including: a pulse generator means for generating a series of pulses which control said control switch means to connect and disconnect intermittently said power supply means and said battery load for storing a reference battery terminal voltage of said battery load therein, said reference battery terminal voltage being a maximum battery terminal voltage measured within an operating period of said battery charger device; a voltage divider means receiving said reference battery terminal voltage from said voltage memory means and deriving a fractional voltage from said reference battery terminal voltage; and a comparator means for comparing said fractional voltage with a current battery terminal voltage from said battery load when said control switch means disconnects said power supply means and said battery load, said comparator means generating a control signal which prevents said control switch means from receiving said pulses form said pulse generator means, thereby disconnecting said power supply means from said battery load so as to terminate charging of said battery load when said current battery terminal voltage is less than said fractional voltage.

2. The battery charger device as claimed in claim 1, wherein said charging control unit further comprises a no-load detector means for detecting if said battery load has been connected to said battery charger device, said no-load detector means disabling said voltage memory means if said battery load is not connected to said battery charging device.

3. The battery charger device as claimed in claim 1, wherein said charging control unit further comprises an AND logic gate which receives said pulses from said pulse generator means and said control signal from said comparator means, said AND logic gate providing said pulses to said control switch means when said control signal is not present.

4. The battery charger device as claimed in claim 1, wherein said voltage memory unit comprises:
   an oscillator circuit which generates a series of pulses;
   a counter means which receives said pulses from said oscillator circuit and which generates an analog voltage output that corresponds to the number of said pulses received thereby; and
   a second comparator means which compares said analog voltage output from said counter means with said current battery terminal voltage from said battery load, said second comparator means disabling said oscillator circuit if said analog voltage output is less than said current battery terminal voltage.

5. The battery charger device as claimed in claim 1, wherein said charging control unit further comprises a reset control means which is connected to said pulse generator means and which generates a reset signal to said voltage memory means each time said pulse generator means generates one of said pulses.

6. A battery charger device for charging a rechargeable battery load, comprising:
   a power supply means for supplying charging current to charge said battery load;
   a voltage-controlled current providing device which connects electrically said power supply means and said battery load; and
   a charging control unit including: a pulse generator means for generating a series of pulses which control said current providing device to connect and disconnect intermittently said power supply means and said battery load; a voltage memory means connected to said battery load for storing a reference battery terminal voltage of said battery load therein, said reference battery terminal voltage being a maximum battery terminal voltage measured within an operating period of said battery charger device; first and second voltage divider means which receive said reference battery terminal voltage from said voltage memory means and which respectively derive higher and lower fractional voltages from said reference battery terminal voltage; first and second comparator means for comparing a respective one of said higher and lower fractional voltage with a current battery terminal voltage form said battery load when said control switch means disconnects said power supply means and said battery load; a current control unit which generates an increasing analog voltage signal if said current battery terminal voltage is greater than said higher fractional voltage and a decreasing analog voltage signal if said current battery terminal voltage is less than said lower fractional voltage, said current providing device receiving said analog voltage signal from said current control unit and controlling the amount of said charging current supplied to said battery load so as to correspond with said analog voltage signal; and a switch control unit which generates a control signal for preventing said current providing device from receiving said pulses form said pulse generator means when said analog voltage signal from said current control unit is less than a preset cut-off voltage, thereby disconnecting said power supply means from said battery load.

7. A method for charging a rechargeable battery load, comprising the steps of:

providing a control switch means for connecting electrically said battery load to a power supply means which supplies charging current for charging said battery load;

providing a pulse generator means which generates a series of pulses that control said control switch means to connect and disconnect intermittently said power supply means and said battery load;

storing a reference battery terminal voltage of said battery load in a voltage memory means, said reference battery terminal voltage being a maximum terminal voltage measured within an operating period of the method of charging;

deriving a fractional voltage form said reference battery terminal voltage;

comparing said fractional voltage with a current terminal voltage form said battery load when said control switch means disconnects said power supply and said battery load; and generating a control signal which prevents said control switch means from receiving said pulses from said pulse generator means, thereby disconnecting said power supply means form said battery load so as to terminate charging of said battery load when said current battery terminal voltage is less than said fractional voltage.

* * * * *